(12) United States Patent
Goldfarb (10) Patent No.: US 8,774,322 B2
(45) Date of Patent: Jul. 8, 2014

(54) CARRIER PHASE ESTIMATION FILTER LENGTH OPTIMIZATION

(75) Inventor: Gilad Goldfarb, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 763 days.

(21) Appl. No.: 12/901,717

(22) Filed: Oct. 11, 2010

(65) Prior Publication Data

US 2012/0087679 A1    Apr. 12, 2012

(51) Int. Cl.
*H04L 27/00* (2006.01)
(52) U.S. Cl.
USPC ........... 375/325; 375/226; 375/232; 375/285; 375/350
(58) Field of Classification Search
USPC .................. 375/229–235, 259–285, 316–350
See application file for complete search history.

(56) References Cited

U.S. PATENT DOCUMENTS

| | | | | |
|---|---|---|---|---|
| 5,909,384 A | * | 6/1999 | Tal et al. | 708/322 |
| 2004/0005017 A1 | * | 1/2004 | Borowski et al. | 375/329 |
| 2005/0289606 A1 | * | 12/2005 | Tsumura | 725/72 |

* cited by examiner

*Primary Examiner* — Sam K Ahn
*Assistant Examiner* — James M Perez
(74) *Attorney, Agent, or Firm* — Ross M. Carothers; David L. Soltz (57) ABSTRACT

The present disclosure provides a system, apparatus and method to reduce phase noise associated with a received data signal, while optimizing system performance. An optimal length of a digital filter, employed in a carrier phase recovery process, is determined such that phase noise is reduced in the received data signal. Reduction of the phase noise present in the received data signal leads to improved receiver performance. The optimal length of the digital filter may be continuously performed, resulting in optimal performance of the receiver.

26 Claims, 10 Drawing Sheets

CARRIER PHASE ESTIMATION FILTER LENGTH OPTIMIZATION

BACKGROUND

Coherent receivers are becoming more popular with increasing demands for higher capacity network infrastructures. Coherent receivers offer increased data capacity over existing fiber links, while accommodating more complex modulation formats, by employing phase-shift keying ("PSK") for example. Such modulation formats may include M-PSK, where $M=2^N$, for N being an integer greater than 0. Some examples of the M-PSK modulation format include binary phase shift keying ("BPSK"), which may also be referred to as 2-PSK, and quadrature phase shift keying ("QPSK"), which may also be referred to as 4-PSK. Higher-order phase shift keying, such as 8-PSK and 16-PSK, are utilized as well.

A coherent receiver is typically synchronous with its associated transmitter. The coherent receiver mixes a received first optical signal from a first laser with a second optical signal from a second laser, for example provided by a local oscillator at the receiver, in order to detect amplitude, phase, and polarization of the received first optical signal. Based upon such detection, data may then be decoded from the received first optical signal.

During a decoding process, the mixed optical signal, including the first and second optical signals for example, is converted into the electrical domain forming a data signal. The data signal includes a stream of symbols, each of the symbols representing one or more bits of data encoded within the data signal, depending on the specific modulation format utilized. For example, a received PSK signal may include a stream of symbols, each symbol representing two bits of data.

One problem with coherent receivers is noise associated with the first and second lasers, and thus present in the first and second optical signals. Such noise may include, for example, phase noise and additive noise. For purposes herein, additive noise may include noise which impacts the amplitude of one or more of the first and second optical signals. Phase noise may result in the undesirable phase shift of one of the first and second optical signals with respect to the other, which may ultimately lead to errors in the data decoding process.

Once in the electrical domain, the data signal may be processed in an attempt to mitigate additive noise such that an estimation of the phase noise can be made. For example, a carrier phase estimation circuit may be employed to provide an estimation of the phase noise present in the data signal. Once detected, the receiver can compensate for the phase noise and demodulate the data signal. The carrier phase estimation circuit typically includes a digital filter, referred also herein as simply a filter, among other elements. The filter may be arranged to provide a filtered or weighted averaged data signal at its output. As is known in the art, a number of taps may be employed by the filter in providing the weighted averaged data signal output. The number of taps employed by the filter may be referred to as the length of the filter, or the filter length. A poorly selected filter length may degrade the performance of the coherent receiver.

What is needed is a receiver which reduces additive noise observed in a received digital signal such that an estimation of the phase noise may be made, resulting in the optimization of the performance of the receiver. Further, what is needed is a receiver which can determine an optimal length of a filter, employed as part of a carrier phase recovery process or scheme, to minimize observed phase noise in a received digital signal while optimizing performance of the receiver. Also, what is needed is a system which continuously determines the optimal filter length over a desired time period.

SUMMARY

The present disclosure provides a system, apparatus and method to reduce phase noise associated with a received data signal, while optimizing system performance. An optimal length of a digital filter, employed in a carrier phase recovery process, is determined such that phase noise is reduced in the received data signal. Reduction of the phase noise present in the received data signal leads to improved receiver performance. The optimal length of the digital filter may be continuously performed, resulting in optimal performance of the receiver. In a first aspect, a data signal is received, the data signal including a plurality of symbols. The plurality of symbols are filtered with a digital filter, the digital filter having a filter length. A portion of the plurality of symbols may be processed to define a correction signal, the correction signal may represented by a difference between a first value and a second value. The filter length of the digital filter may then be adjusted based upon the correction signal. In certain embodiments, the first and second values are associated with a distribution of data corresponding to the portion of the plurality of symbols. In other embodiments, the distribution of data may define a geometric shape, such as an elliptical shape, a circular shape, or a tear-drop shape.

In still other embodiments, the geometric shape may include a centroid and a circumference, such that the first value is a first length extending from the centroid of the geometric shape to the circumference of the geometric shape along a first axis. The second value may be a second length extending from the centroid of the geometric shape to the circumference of the geometric shape along a second axis, the first axis being orthogonal to the second axis. In certain other embodiments, the first value may be a first variance value associated with a portion of the plurality of symbols extending from the centroid of the geometric shape to the circumference of the geometric shape along a first axis. The second value may be a second variance value extending from the centroid of the geometric shape to the circumference of the geometric shape along a second axis. The first axis may be orthogonal to the second axis. In still other embodiments, the distribution of data may be provided on a complex plane including first, second, third and fourth quadrants. The plurality of symbols in one or all of the first, second, third, and fourth quadrants may be processed to determine the correction signal.

In another aspect, a data signal is received, the data signal including a plurality of signals. The plurality of signals may be filtered by a digital filter having a filter length. The plurality of symbols may be processed into one of four data groups, each of the four data groups associated with one of four quadrants of a complex plane. The first of the four data groups in a first of the four quadrants of the complex plane may be processed to define a geometric shape. The geometric shape may include a first dimension of a first length and a second dimension of a second length. In some embodiments, the first and second dimensions of the geometric shape are orthogonal. A difference between the first and second lengths may be determined, the filter length of the digital filter being adjusted based upon the difference. In certain embodiments, the plurality of symbols associated with one or more of a second, a third, or a fourth of the four data groups may be combines with the plurality of symbols associated with the first of the four data groups prior to processing of the first of the four data groups. In still other embodiments, the complex plane includes an origin and first, second, third, and fourth data groups each define corresponding geometric shapes, each of the first, second, third, and fourth geometric shapes may include a centroid. The plurality of symbols associated with each of the first, second, third, and fourth of the four data groups may be rotated about the origin of the complex plane such that the centroid of each of the four geometric shapes are aligned to form a new geometric shape which is then processed to determine an filter length of the digital filter. The filter length of the digital filter providing optimal receiver performance.

Other objects, features and advantages of the various embodiments of the disclosure will be apparent from the drawings, and from the detailed description that follows below.

BRIEF DESCRIPTION OF THE DRAWINGS

The accompanying drawings, which are incorporated in and constitute a part of this specification, illustrate one or more implementations described herein and, together with the description, explain these implementations. These drawings are intended to be illustrative, not limiting. In the drawings wherein like reference symbols refer to like parts:

FIGS. 7A-6E illustrate still another exemplary algorithm, according to certain aspects of the embodiments of this disclosure.

BACKGROUND

The present disclosure provides a system, apparatus and method to reduce phase noise associated with a received data signal, while optimizing system performance. An optimal length of a digital filter, employed in a carrier phase recovery process, is determined such that phase noise is reduced in the received data signal. Reduction of the phase noise present in the received data signal leads to improved receiver performance. The optimal length of the digital filter may be continuously performed, resulting in optimal performance of the receiver.

The following description is set forth for purpose of explanation in order to provide an understanding of the various embodiments of the disclosure. However, it is apparent that one skilled in the art will recognize that these embodiments, some of which are described below, may be incorporated into a number of different systems and devices. Additionally, the embodiments of the present disclosure may include certain aspects each of which may be present in hardware, software, or firmware. Structures and devices shown in block diagram in the figures are illustrative of exemplary embodiments and are meant to avoid obscuring certain aspects of the embodiments of the disclosure. Furthermore, connections between components within the figures are not intended to be limited to direct connections. Rather, data between these components may be modified, re-formatted or otherwise changed by intermediary components.

Figure 1A:
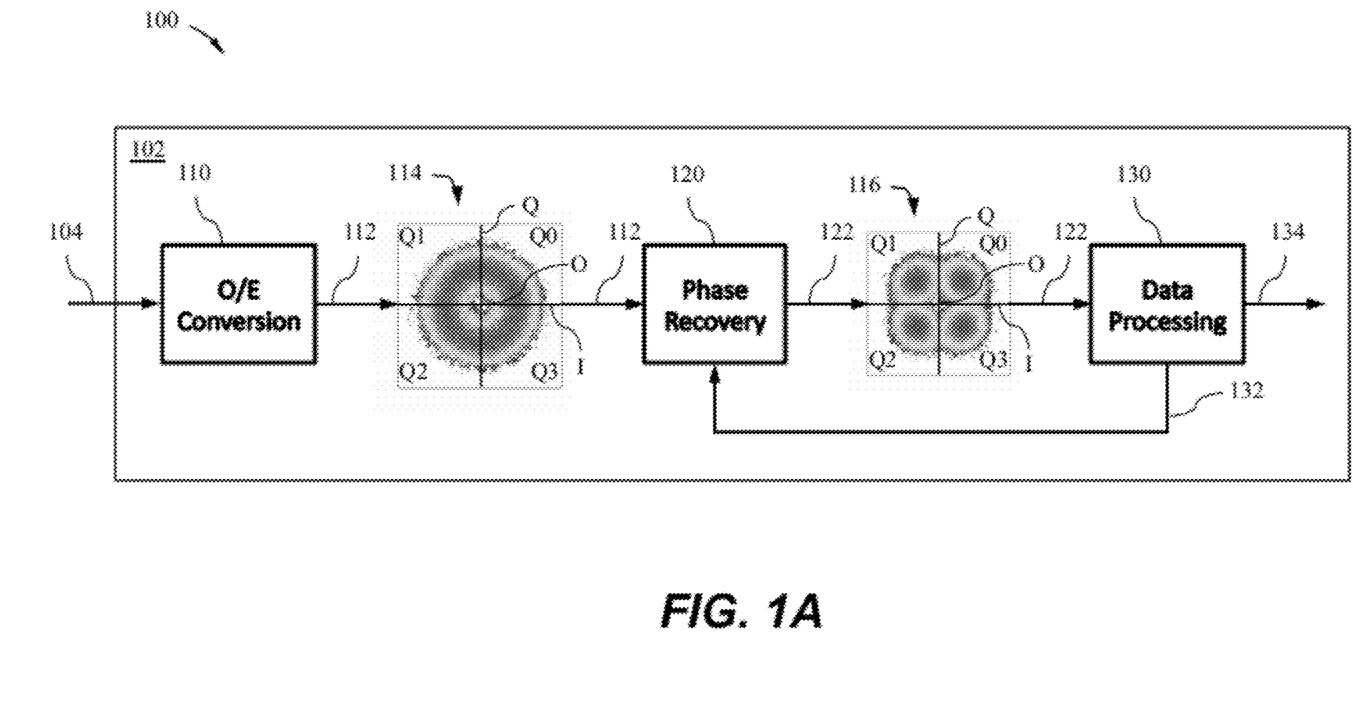
FIG. 1A illustrates a general block diagram of an optical receiver, according to certain aspects of the embodiments of this disclosure.

FIG. 1 illustrates a general block diagram of a portion 102 of an optical receiver 100. The optical receiver 100, for example a coherent receiver, receives an optical signal 104 in a modulation format employing PSK, for example. The optical signal 104 is provided by a first laser located in a transmitter (not shown). The optical signal 104 may be mixed with another optical signal provided by a second laser (not shown) local to the receiver in an optical-to-electrical (O/E) conversion circuit 110. The mixed optical signal is then converted into the electrical domain by the O/E conversion circuit 110 to provide corresponding in-phase (I) and quadrature signals (Q), referred to collectively herein as an I/Q signal. The I/Q signal is provided as a data signal 112 output from the conversion circuit 110. The I/Q signal may include a stream of contiguous symbols, each of which representing one or more bits of data encoded on the received optical signal 104 depending on the particular modulation format employed. For example, for an optical signal 104 having a QPSK modulation format, each of the symbols of a corresponding I/Q signal represents 2 bits of encoded data.

Graph 114 of FIG. 1A depicts the data signal 112 in a complex plane with respect to I and Q axes. The I and Q axes may also be referred to as the real and imaginary axes, respectively. The I and Q axes divide the complex plane into four portions or quadrants Q0, Q1, Q2, Q3, such that the data signal 112 has portions in each quadrant Q0-Q3. Phase noise, which may exist in the optical signals output from either, or both, the first and second lasers causes the data signal 112 in the complex plane to rotate over time about an origin O. As a result, the data signal may be represented as a doughnut shape plot about the origin O for example. Additionally, additive noise present in the data signal 112 impacts the amplitude of the data signal 112, defining the width of the doughnut for example.

The data signal 112 may then be provided to a phase recovery circuit 120 which provides some correction to reduce the additive noise present in the data signal 112, such that an estimation of the phase noise can be performed. The phase recovery circuit 120 includes a filter 124, described with respect to FIG. 1B below, which filters, or otherwise provides a weighed average, of the additive noise present in the data signal 112. The phase recovery circuit 120 then compensates for a portion of the phase noise present in the data signal 112, and provides a compensated data signal 122 at an output of the phase recovery circuit 120. Graph 116 depicts the compensated data signal 122 in the complex plane as a data constellation. Since the phase noise in the compensated data signal 122 has been partially compensated, individual constellation points within each of the individual quadrants Q0-Q3 are more readily apparent. The compensated data signal 122 is then provided to data processing circuitry 130 which analyzes the compensated data signal 122 to provide a feedback signal 132 to the phase recovery circuit 120. The feedback signal 132 may then be utilized to further optimize the performance of the phase recovery circuit 120, and the overall performance of the optical receiver 100, by further reducing the phase noise present in the data signal 112. The data processing circuitry 130 may also be configured to decode the I/Q signal into data which is provided as an output 134. Alternatively, the data processing circuit 130 may pass the compensated signal 122 as the output 134, another system or circuit (not shown) providing the data decoding function.

Figure 1B:
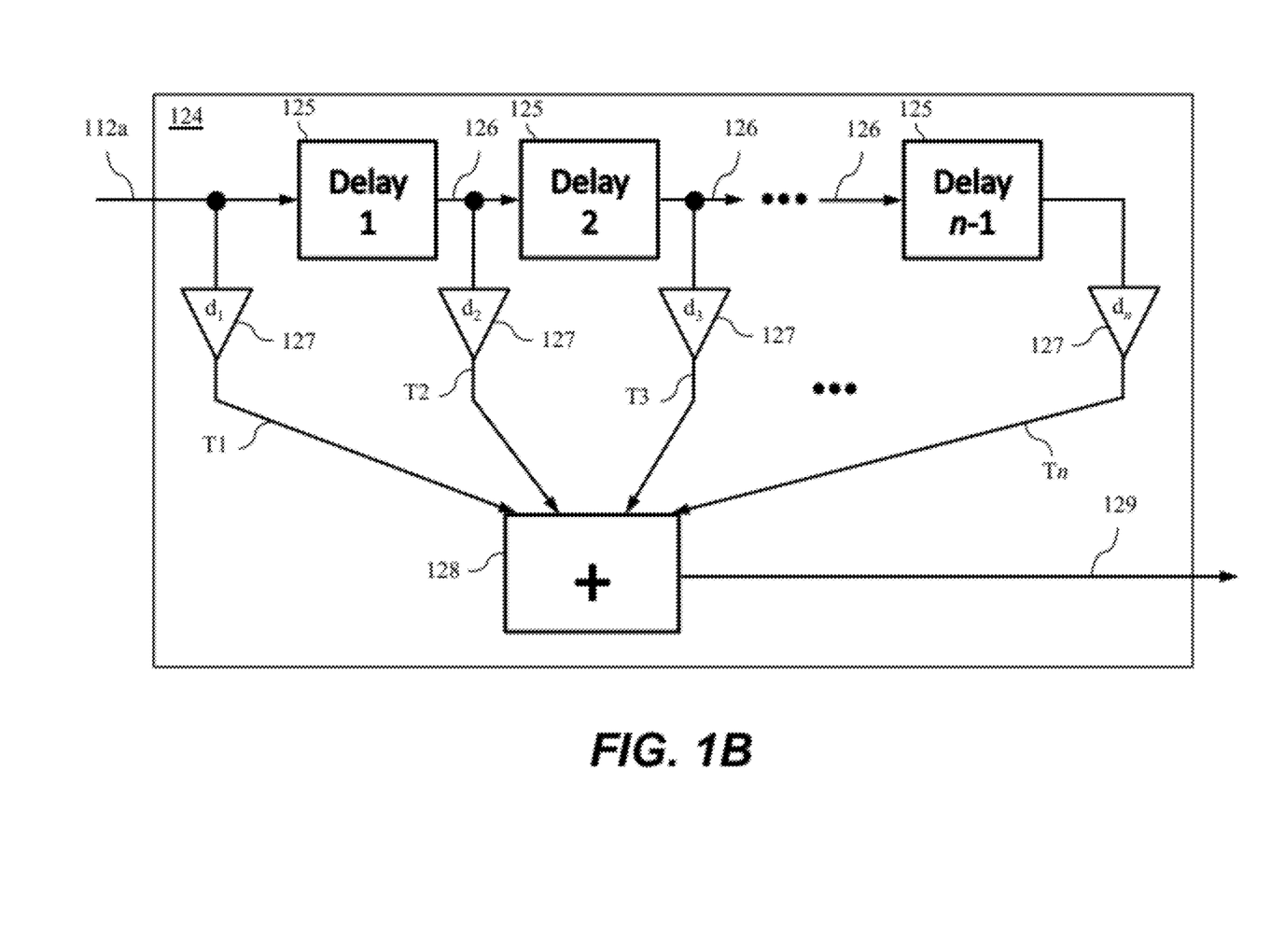
FIG. 1B is an exemplary filter used with the optical receiver of FIG. 1A, according to certain aspects of the embodiments of this disclosure.

Turning to FIG. 1B, one exemplary filter 124 which may be employed in the phase recovery circuit 120 of the receiver 100 of the various embodiments of the present disclosure will be described in greater detail. Phase recovery circuit 120 may be similar to feed-forward carrier recovery circuits known in the art, for example. The filter 124 receives a data signal 112a and provides an output signal 129 in response to the received data signal 112a. The data signal 112a may be similar to, or derived from, the data signal 112. For example, the phase recovery circuit 120 may include additional elements which may be used to process the data signal 112 into the data signal 122a prior to reaching the filter 124. The filter 124 may include n taps, labeled T1 through Tn, collectively referred to as taps Tn. Each of the taps Tn may include amplifiers 127 which may be used to amplify or attenuate a signal propagating through the corresponding tap by an amount, represented by a coefficient $d_n$. For example, a signal propagating through tap T1 may be amplified or attenuated by the associated amplifier 127 in tap T1 by an amount corresponding to $d_1$. The filter may also include delay units 125, labeled "Delay 1" through "Delay n−1", positioned between successive taps. The filter 124 receives and delay-shifts the data signal 122a through each of the delay units 125 along paths 126. The signals provided by taps 1 through taps Tn, some of which are delayed by one or more delay units 125, are summed in a summer 128 to provide the output signal 129, which is further employed to reduce additive noise in the received signal 112, such that phase noise may be estimated. The length of the filter 124 may be described as a filter length of n, n equal to or greater than 1, e.g. the number of the taps Tn employed by the filter 124 having a non-zero coefficient $d_n$. The filter length may be increased, for example, by changing one of the tap coefficients $d_n$ from a setting of zero to a non-zero value. Additionally, the filter length may be decreased by changing one of the tap coefficients $d_n$ from a non-zero value to a value of zero. Under certain circumstances the length of the filter 124 may be 1, while under other circumstances the length of the filter may be much longer. The output signal 129 may be further processed by the phase recovery circuit 120 to provide the compensated data signal 122, the output signal 129 from the filter 124 further processed by one or more additional elements (not shown) of the phase recovery circuit 120 for example.

The functionality of the filter 124, that is, the control and setting of the length of the filter 124, may be provided by one or more integrated processing chips as part of the phase recovery circuit 120, or part of the portion 102 of the receiver 100. Each of the one or more integrated processing chips may be, for example, in the form of an application specific integrated circuit (ASIC), a programmable gate array (PGA), field-programmable gate array (FPGA), or the like. Each of the integrated processing chips may be configured to be self-controlled or controlled by a controller (not shown) located external to the phase recovery circuit 120. Alternatively, the filter 124 may be controlled through a processor under software control, in the form of firmware executed by the processor for example.

Figure 2A:
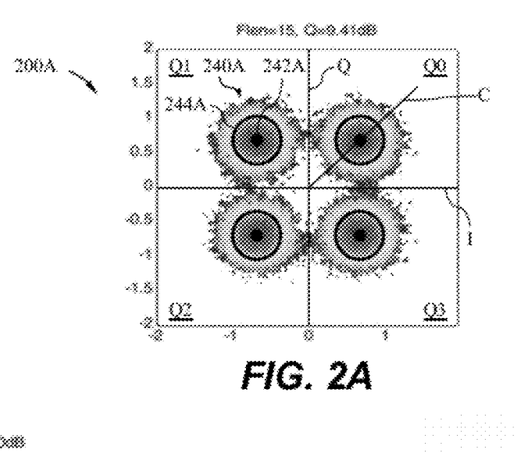
FIGS. 2A-2C depict graphs illustrating exemplary decoded data with respect to certain corresponding filter lengths of the filter of FIG. 1B.
Figure 2B:
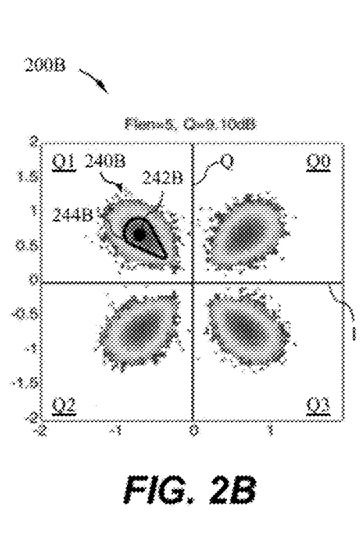
Figure 2C:
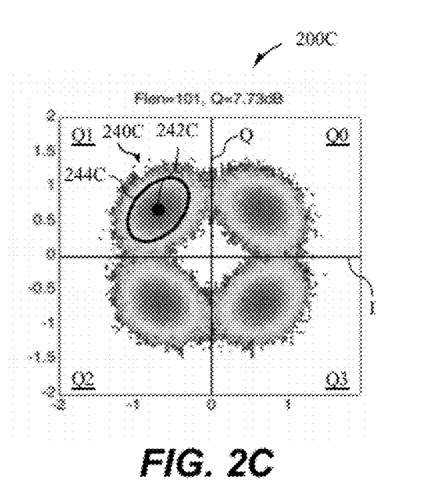

FIGS. 2A-2C depict different exemplary representations of the data signal 122 which may be processed, in part, by the phase recovery circuit 120. FIG. 2A depicts a data constellation or graph 200A of a compensated data signal 122A, similar to compensated data signal 122, after being processed by the phase recovery circuit 120, including the filter 124 employing a length of 15, e.g. 15 taps are employed by the filter 124. As indicated, the corresponding performance of the receiver 100 is Q=9.41 dB. For a compensated data signal having a M-PSK modulation format, where $M=2^N$, and N being an integer greater than 0, the corresponding constellation would include M constellation points. Accordingly, since the compensated data signal 122A is in a 4-PSK modulation format in the examples depicted in FIGS. 2A-2C, the data constellation 200A includes four constellation points 242A. Each of the constellation points represents a demodulated data symbol, representing one or more bits of data for example. For a 4-PSK signal, there are four constellation points 242A. A first constellation point 242A of quadrant Q0, for example, may represent the multiple bits of 0,0. A second constellation point 242A of quadrant Q1 may represent bits 0,1, a third constellation point 242A of quadrant Q2 may represent bits 1,1, and a fourth constellation point 242A of quadrant Q3 may represent bits 1,0.

As depicted in FIG. 2A, since the effect of phase noise has been mitigated, data of each of the constellation points 242A has a generally circular shape indicated by circle 244A. Only one centroid 242A and corresponding circular shape 244A is shown for purposes of clarity. As used herein, the term 'centroid' is to be generally defined as the center of the data distribution for each constellation point of a data constellation. For a signal in a 4-PSK modulation format, as the compensated data signal 122A, each of the four constellation points have centroids located on a line which passes through the origin O and bisects the associated quadrant Q0-Q3, for example line C which bisects quadrant Q0.

FIG. 2B depicts a data constellation or graph 200B of a compensated data signal 122B, similar to data signal 122, after being processed by the phase recovery circuit 120, including the filter 124 having a length of 5, e.g. 5 taps employed by the filter 124. As indicated, the corresponding performance of the receiver 100 decreases to Q=9.10 dB as the length of the filter 124 decreases from 15 to 5. The data constellation 200B includes constellation points 242B, one per quadrant Q0-Q3, and each having a centroid 244B. However, the data distribution of each constellation point 242B is represented by the tear-drop shape 244B of the compensated data signal 122B, as depicted in quadrant Q1. As the data distribution of the constellation points transition from a circular shape, such as constellation points 242A of FIG. 2A, to a tear-drop shape, such as constellation points 242B of FIG. 2B, the performance of the receiver 100 may degrade, which may lead to errors in the data decoding process. Data distributions as depicted in FIG. 2B, for example, can lead to increased bit error rates, resulting in poor performance of the receiver 100.

FIG. 2C depicts a data constellation or graph 200C of a compensated data signal 122C after being processed by the phase recovery circuit 120 including the filter 124 having a filter length of 101, e.g. 101 taps employed by the filter 124. As compared with the graph of FIG. 2A, the corresponding performance of the receiver 100 decreased to Q=7.73 dB as the length of the filter 124 increases from 15 to 101. The data constellation 200C includes constellation points 242C, one per quadrant Q0-Q3, and each having a centroid 244C. Similar to the compensated data signal 122B of FIG. 2B, the data distribution in each quadrant Q0-Q3 of the data constellation 200C is non-circular. Rather, each constellation point 242C has a non-circular or elliptical shape represented by the ellipse 244C around each centroid 242C. As stated above with respect to the tear-drop 244B shape of the constellation points 242B of FIG. 2B, the elliptical shape 244C of the constellation points 242C may lead to increased bit error rates, resulting in poor performance of the receiver 100. Thus, FIG. 2A depicts a desired data output, under most circumstances, while FIGS. 2B and 2C depict situations where the selected or determined length of the filter 124 is either two short (FIG. 2B) or too long (FIG. 2C). It is advantageous to optimize the performance of the filter 124 by selecting the appropriate filter length, resulting in improved performance of the receiver 100, such that the data has a circular distribution about each constellation point.

Figure 3A:
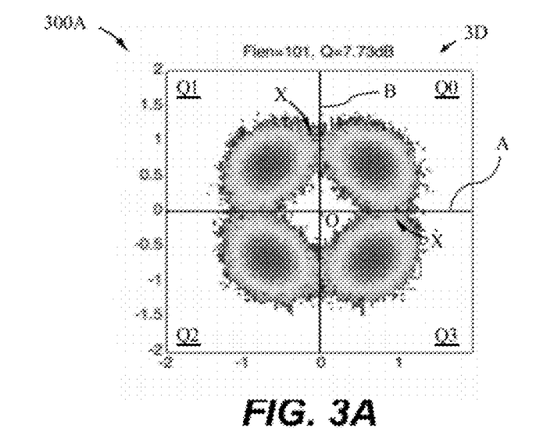
FIGS. 3A-3F illustrate an exemplary algorithm, according to certain aspects of the embodiments of this disclosure.
Figure 3B:
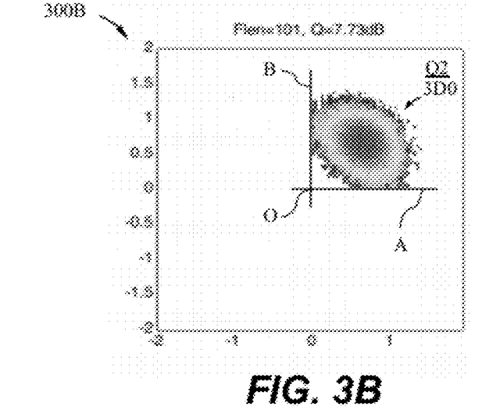
Figure 3C:
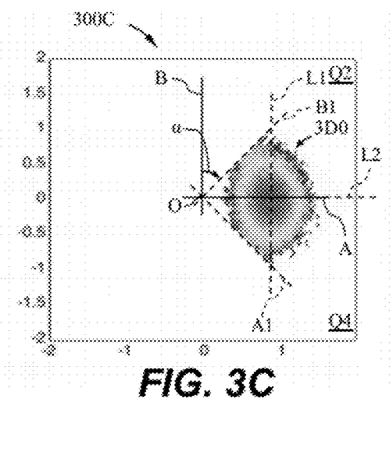

FIGS. 3A-3F depict a first exemplary algorithm for determining an optimal length for filter 124. FIG. 3A depicts a data constellation or graph 300A corresponding to the compensated data signal 122C of FIG. 2C. The graph 300A includes a first axis A and a second axis B which define each of the four quadrants Q0-Q3. The A axis and the B axis intersect at an origin identified as O. The A axis may also be referred herein as the I axis or the real axis, while the B axis may also be referred herein as the Q axis or the imaginary axis. The data 3D in quadrants Q1, Q2, and Q3 may be discarded, resulting in data 3D0 as depicted in Graph 300B of FIG. 3B. As should be readily apparent to one of ordinary skill in the art, while the first exemplary algorithm of FIGS. 3A-3F does not include that portion of the data 3D within quadrants Q1, Q2, and Q3, all or a portion of such data may be included in alternative algorithms, as discussed in greater detail below with respect to FIGS. 6A-6C for example. FIG. 3C depicts the data 3D0 rotated by an angle α about the origin O, defining a B1 axis offset from the B axis by α degrees and an A1 axis offset from the A axis by α degrees (A1 and B1 axes shown in dashed line). The data 3D0 may be rotated any suitable angle α such that the data 3D0 is equally distributed about the A axis, for example approximately one-half of the data 3D0 being in the quadrant Q0 and the remaining one-half of the data 3D0 being in the quadrant Q3. The data 3D0 need not be evenly distributed about the A axis, however such un-even distribution may result in error, which may decrease the overall performance of the receiver 100. The data 3D0 is generally distributed throughout the quadrant Q0 such that rotation of the data by the angle α of −45 degrees (clockwise) will result in a substantially an even distribution of the data 3D0 about the A axis, for example about one-half of the data being above the A axis while about one-half of the data being below the A axis. Rotation of the data 3D0 may be performed through any suitable means. For example, rotation of the data 3D0 may be achieved through the execution of a matrix operation, the complex data 3D0 being rotated about the origin O by the angle α. A new axis system may then be defined relative to a centroid 332C, or other desired point, of the rotated data 3D0. The new axis system is depicted in FIGS. 3C-3F by line L1 and line L2, line L2 being overtop the A axis.

Figure 3D:
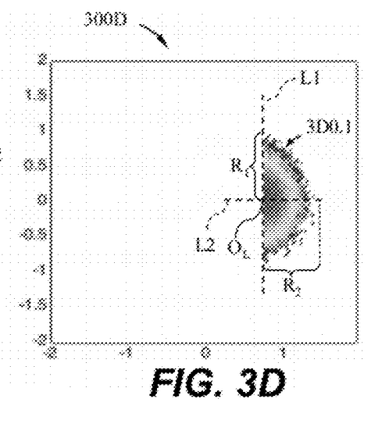
Figure 3E:
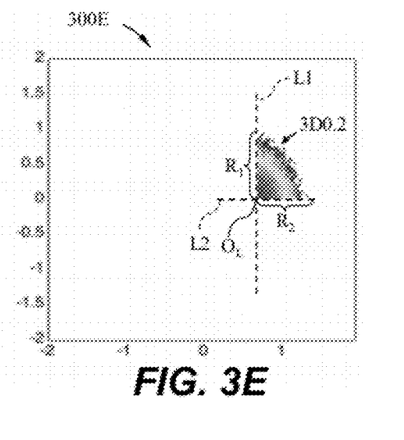

Returning to FIG. 3A, a portion X of the data 3D0 crosses over the boundary between quadrants Q0 and Q3, as well as between quadrants Q0 and Q1. Thus, when the data 3D corresponding to quadrants Q1, Q2, and Q3 is deleted or removed to form data 3D0, not every symbol as part of the data 3D0 is present. These missing symbols, e.g. the data associated with quadrant Q0 but not part of the data 3D0, may be estimated through statistical analysis of the data 3D0. Alternatively, a subset of symbols forming data 3D0, as depicted in FIG. 3D, may be considered in optimization of filter 124. With the lines L1, L2 traveling through the centroid of the data 3D0, that portion of data 3D0 having a real component less than that associated with line L1 is deleted to form new data 3D0.1, as defined in FIG. 3D.

As shown in FIG. 3D, the lines L1 and L2 may intersect an origin $O_L$. Lines L1 and L2 may be described as being along the major and minor axis of a geometric shape encompassing the data 3D0, an elliptical shape for example. Considering that portion of the data 3D0.1 in the quadrant Q0 defined by the L1 and L2 axes, e.g. the upper-right quadrant, the extent the data 3D0.1 is distributed along the L1 axis may be defined as a length R1, while the extent the data 3D0.1 extends along the L2 axis may be defined as a length R2. The length R1 may be defined as a circumference of the geometric shape encompassing the data 3D0.1. As used herein, the term circumference is the distance from the centroid of quadrant data, such as data 3D0, and extending outward to an outer boundary of the geometric shape. The geometric shape need not be a circle, but may be any geometric shape formed by the data 3D0, such as an elliptical shape or a tear-drop shape. As depicted, the length R1 is greater than the length R2, such that a difference between the length R1 and the length R2 is not zero. The difference between the length R1 and the length R2 may be minimized such that the geometric shape of the data 3D0 is more circular, as the circular shape 232A in FIG. 2A. In order to equalize the lengths R1 and R2, such that the difference between the lengths R1 and R2 is reduced to zero for example, the length of the filter 124, for example the taps employed by the filter 124, is preferably correspondingly decreased. As the length of the filter 124 is decreased the algorithm discussed with respect to FIG. 3 may be continuously performed to identify the corresponding values of lengths R1 and R2 until the difference between the lengths is near to or equal to zero. More specifically, with length R1 greater than length R2, the number of taps of the filter 124 may be decreased by a value, 1 for example. A decrease in the filter length need not be abrupt, setting one of the non-zero coefficients $d_n$ of one of the taps $T_n$ instantaneously to zero for example. Rather, the filter length may be decreased through successive decrease in one or more of the non-zero coefficients $d_n$ corresponding to one or more taps $T_n$ until at least one of the non-zero coefficients is zero. For purposes herein, such a successive decrease is deemed to be included as decreasing the filter length of the filter 124. The change in the filter length of the filter 124, as well as a change in the noise, phase noise or additive noise, which may be present in the compensated data signal 122, will then result in a different distribution of the data 3D0.1 with respect to the origin $O_L$. The algorithm of FIG. 3 may then be repeatedly performed in an attempt to reduce the difference between the lengths R1 and R2 to zero, in light of the noise present in the compensated data signal 122.

The determination of the lengths R1 and R2 is one such determination to describe the distribution of the data 3D0.1 about the origin $O_L$. For example, rather than lengths along the L1 and L2 axes, R1 and R2 may represent variances of a portion of the data 3D0.1 within quadrant Q0 with respect to the L1 and L2 axes. For purposes herein, a variance may be constructed to mean the quantity equal to the square of the standard deviation with respect to a group of data, such as that portion of the data 3D0.1 within quadrant Q0. For illustration purposes only, considering the symbols of a portion of data 3D0.1, each symbol of the portion including a positive imaginary portion and a positive real portion, R1 may represent a first variance with respect to the L1 axis, and R2 may represent a second variance with respect to the L2 axis. Similar to the analysis above, the first variance value of R1 is greater than the second variance value of R2 and the difference of the first variance value of R1 and the second variance value of R2 may be reduced to improve the performance of the receiver 100. A decrease in the filter length of filter 124 will result in the corresponding decrease in the difference of the first and second variances of R1 and R2, respectively. The length of the filter 124 may be further decreased until the difference between the variances R1 and R2 is near, or equal, to zero. When the variances R1 and R2 are substantially equal, the corresponding length is the desired length for the filter 124, and the performance of the receiver 100 may be optimized.

Figure 4A:
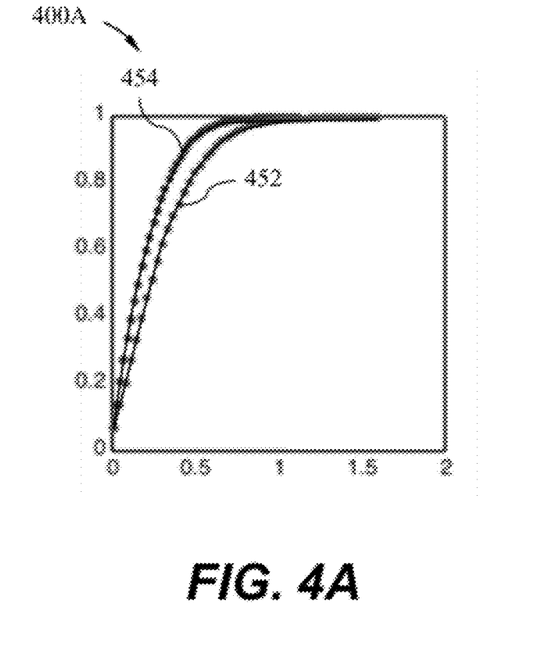
FIG. 4A is a graph depicting variances in signals associated with the first exemplary algorithm of FIGS. 3A-3F.

Turning to FIG. 4A, a graph 400A depicts exemplary plots of a cumulative density function (CDF), as well know in statistics, with respect the real and imaginary portions of each symbol of that portion of the data 3D0.1 which includes a positive real portion and a positive imaginary portion. More specifically, graph 400A depicts a first curve 450 which represents the first variance R1 along the imaginary axis and a second curve 452 represents the second variance R2 along the real axis. As depicted, the first curve 440 is shifted a positive direction from the second curve 442. As the length of the filter 124 is decreased, the first and second curves move toward each other until the first curve 440 overlaps the second curve 442. The length of the filter 124 when the first curve 440 overlaps the second curve 442 is the desired length for the filter 124.

Figure 4B:
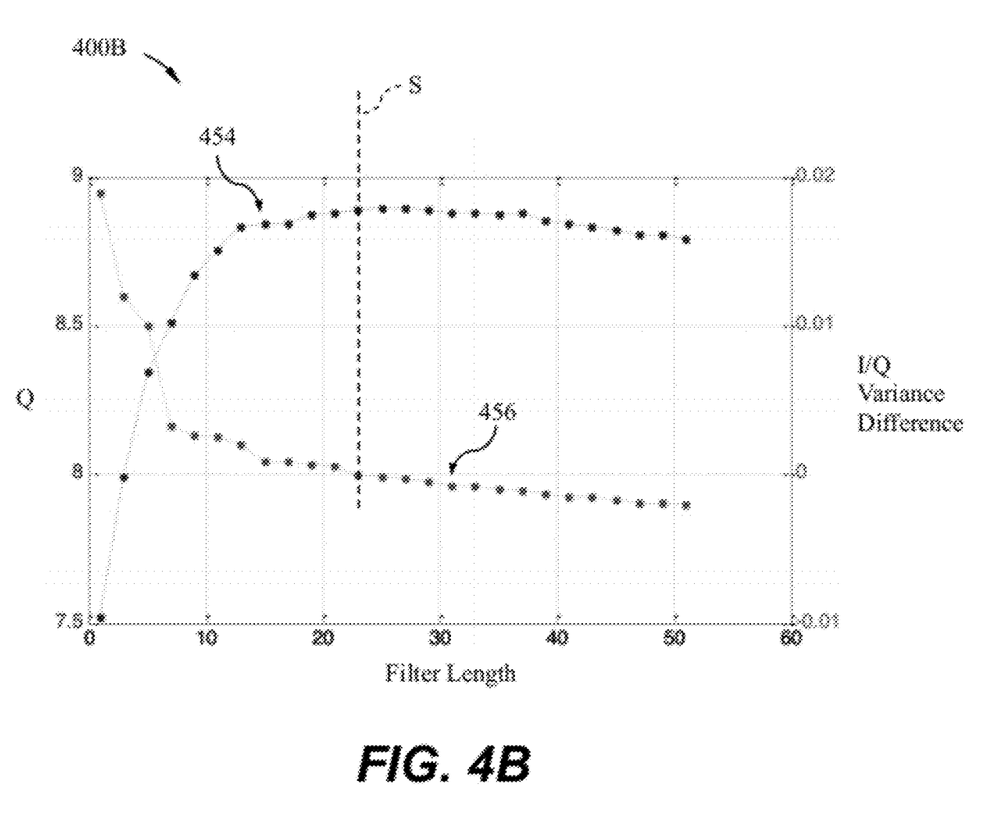
FIG. 4B is a graph depicting performance of an exemplary phase estimation filter versus filter length.

A graph 400B of FIG. 4B depicts exemplary plots of the performance of the receiver 100 and the I/Q variance difference, e.g. the difference between the first variance R1 and the second variance R2, for an exemplary data signal, such as data signal 122C. A first curve 454 represents the performance of the receiver 100 in terms of the quality factor, Q, of the receiver 100 versus the length of the filter 124, employed as part of the phase recovery circuit 120. As shown, as the filter length increases, the performance of the receiver 100 improves, reaches optimum performance, discussed in greater detail below, and then gradually drops off. A second curve 456 of FIG. 4B represents the I/Q variance difference versus the length of the filter 124. As depicted, as the difference of the first variance R1 and the second variance R2 goes from a positive value toward zero, the length of the filter 124 increases from 1 to approximately 23. As the difference of the first and second variances R1, R2 continues to decrease from 0 toward 0.01, the length of the filter 124 continues to increase from approximately 24. As mentioned above, when the first and second variances R1, R2 are equal, the length of the filter is optimized to provide optimum performance of the receiver 100. Thus, the I/Q variance difference of zero corresponds to receiver 100 performance of approximately Q=8.8 dB, as indicated by dashed line S.

Turning back to FIG. 3E, a graph 300E depicts data 3D0.2 which is derived from the data 3D0.1 by moving or folding those symbols below the L2 axis, e.g. having a negative imaginary portion, into that portion of the data D2.1 which exists above L2. For example, the data 3D0.2 may be formed by setting the imaginary portion of each symbol of the data 3D0.1 to the absolute value of the imaginary portion. Once the data 3D0.2 is defined, the analysis related to the calculation of the variances R1 and R2 may be performed. For example, since the variance R1 is greater than the variance R2, as performed by the data processing circuit 130 for example, a correction or error feedback signal 132 is provided back to the phase recovery circuit 120, which adjusts the length of the filter 124 in response to the received error feedback signal 132. In this case, the length of the filter 124 is decreased.

Figure 3F:
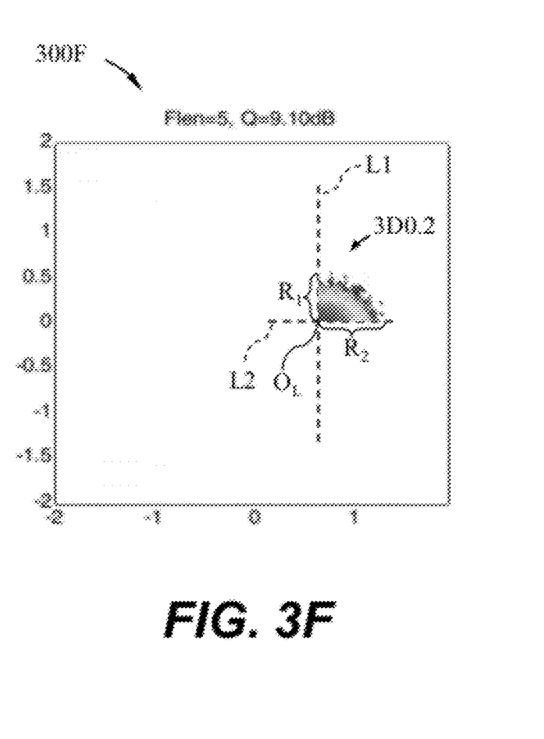

Turning to FIG. 3F, a graph 300F depicts the result of the algorithm of FIGS. 3A-3E performed with respect to the tear-drop shaped compensated data signal 122B as depicted in FIG. 2B. As shown, the variable R1 is less than the variable R2, whether R1 and R2 represent a length or a variance with respect to the data 3D0.2 of FIG. 3F. Thus, the length of the filter 124 is increased to equalize the difference between R1 and R2. As stated above with respect to data 3D0.2 of FIG. 3E, when the variances or lengths R1 and R2 are substantially equal, the corresponding length is the desired length for the filter 124, e.g. reducing phase and additive noise present and increasing performance of the receiver 100. While the algorithm of FIGS. 3A-3F describe aligning the centroid 342 of the constellation point 340 with respect to the real axis, such alignment is for illustration purposes only. For example, the centroid 342 need not be rotated at all, as discussed in FIGS. 5A and 5B below, or if preferred due to the availability of processing resources, may be rotated any amount about the origin O.

Figure 5A:
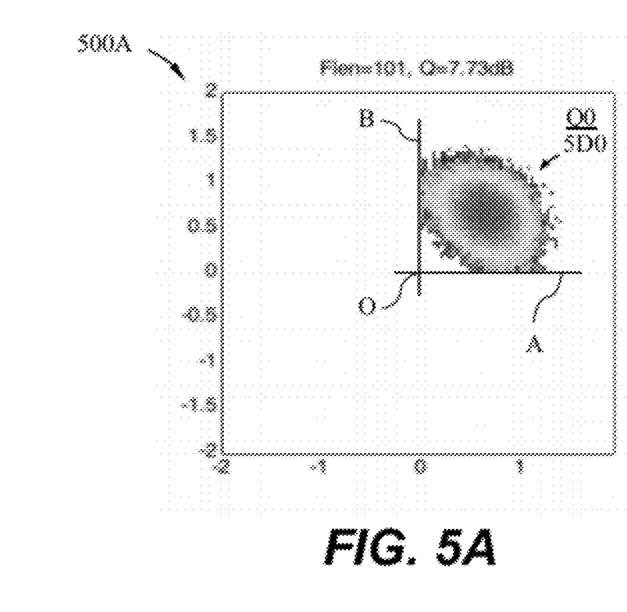
FIGS. 5A-5B illustrate another exemplary algorithm, according to certain aspects of the embodiments of this disclosure.
Figure 5B:
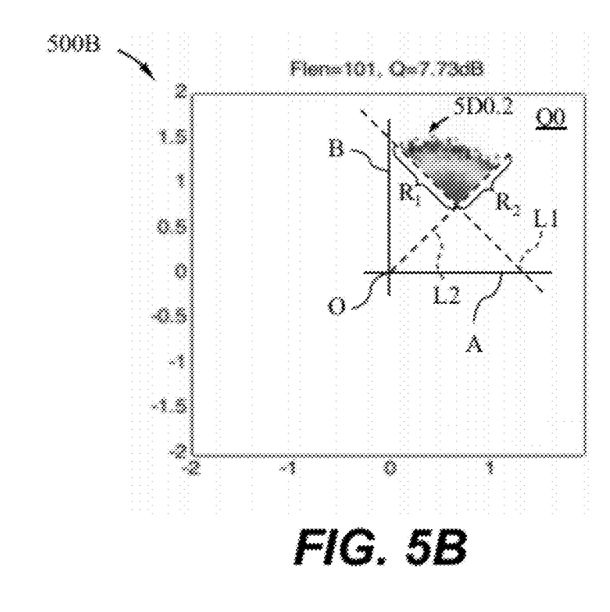

Turning to FIGS. 5A and 5B, another algorithm in accordance with certain embodiments of this disclosure is illustrated. FIG. 5A depicts data 5D0 of quadrant Q0, data 5D0 being similar to data 3D0 for example. Rather than rotating or repositioning, e.g. further processing, the data 5D0, the L1 axis and the L2 axis are positioned within the quadrant Q0 as depicted in FIG. 5B. The L2 axis passes through the origin O of the complex plane and the centroid of the data 5D0 of quadrant Q0, while the L1 axis of FIG. 5B is orthogonal to the L1 axis and passes through the centroid of the data 5D0. Using similar techniques as discussed with respect to the L1 and L2 axes of the embodiment depicted in FIGS. 3C-3F, the data 5D0.2 is defined. A first variance R1 of the data 5D0.2 and a second variance R2 of the data 5D0.2 are further defined relative the geometric shape of data 5D0.2. From the variance values R1, R2, an I/Q variance difference may be calculated and a corresponding length of the filter 124 may be determined, as discussed in detail above with respect to FIGS. 3C-3F.

Figure 6A:
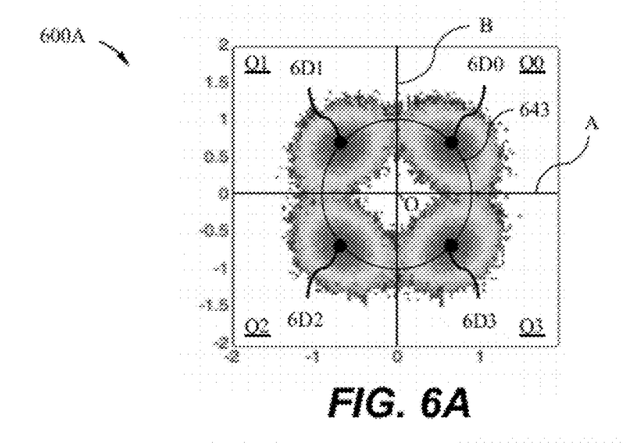
FIGS. 6A-6C illustrate yet another exemplary algorithm, according to certain aspects of the embodiments of this disclosure.
Figure 6B:
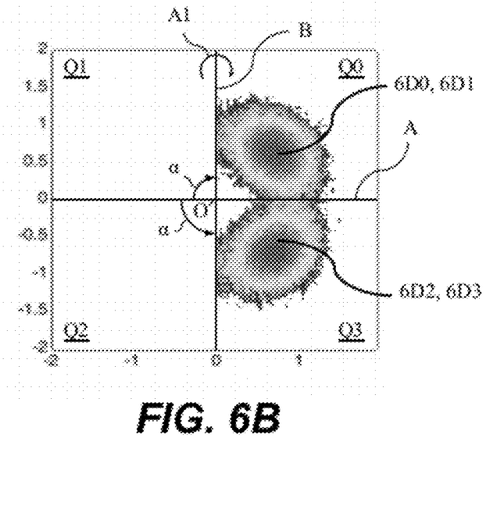
Figure 6C:
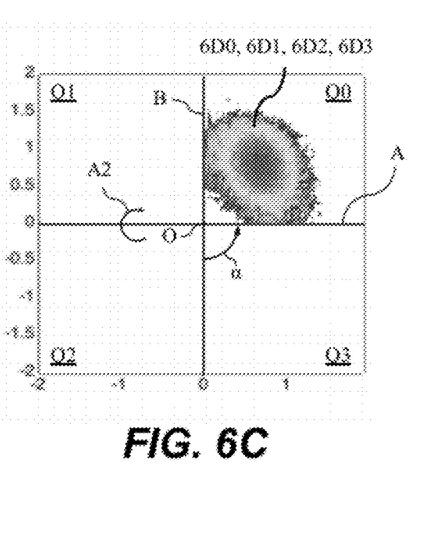

Turning to FIG. 6A, yet another algorithm in accordance with certain embodiments of this disclosure will be discussed in greater detail. FIG. 6A depicts a data constellation of data 6D, similar to that of data 3D depicted in FIG. 3A. The data 5D includes individual quadrant data 6D0-6D3 corresponding to quadrants Q0-Q3, respectively. Rather than processing the data 6D0 of quadrant Q0, a more accurate determination of the variances R1 and R2 may be determined if the complete data 6D set is taken into consideration. Turning to FIG. 6B, the data 6D1 of quadrant Q1 may be folded into the data 6D0 of quadrant Q0. The data 6D1 may be folded into the quadrant Q0 by setting the real part of each symbol of the data 6D1 to the absolute value of the real part of each symbol or by converting each symbol of the data 6D1 by setting the real part of each symbol to the absolute value of the real part of each symbol. Alternatively, each of the symbols of the data 6D1 may be rotated an angle α degrees about the origin O, through a matrix operation for example. For example the data 6D1 may be rotated 90 degrees (clockwise) about the origin O. In any case, the data 6D1, 6D0 are merged in quadrant Q0. In similar fashion, the data 6D2 of quadrant Q2 may be folded or rotated into the data 6D3 of quadrant Q3. Turning to FIG. 6C, the data 6D2, 6D3 of quadrant Q3 may then be folded about the A axis or rotated 90 degrees (counter-clockwise) about the origin O such that the complete data 6D, e.g. data 6D0-6D3, exists solely in the quadrant Q0. The analysis to determine the adequate length of the filter 124 may then proceed as illustrated and discussed in greater detail with respect to FIGS. 3C-3F, for example. By combining all the symbols of the data 6D into one quadrant, a more accurate determination of the length of the filter 124 can be achieved.

As is true with other algorithms discussed herein, while the algorithm of FIGS. 6A-6C was described with respect to combining the complete data 6D in the quadrant Q0, each individual data 6D0-6D3 may be combined in other ones of the quadrants Q1, Q2, or Q3 prior to being rotated between quadrants Q0 and Q3 as depicted in FIG. 3C, or otherwise further processed to obtain the optimum length of the filter 124. Further, as with other algorithms discussed herein, performance of the particular algorithm does not require the processing of every data point, as part of data 6D for example. Rather, one may consider a limited number of data points, representative of the data constellation which the data represents for example, the optimum filter length being determined from the limited number of data points.

While the various algorithms described herein make reference to aligning the centroids of the various constellation points at specific locations, such alignment at specific locations is for illustration purposes only. For example, with reference to the algorithm of FIGS. 6A-6C, the centroids 642 of each of the constellation points 640 may be aligned at any point along a circle 643 whose center is at origin O and which passes through each of the centroids 642, as depicted in FIG. 6A. Once aligned, the data processing can continue to determine the corresponding variables R1 and R2 and, ultimately, the length of filter 124 as part of the phase recovery circuit 120, as described herein.

Figure 7A:
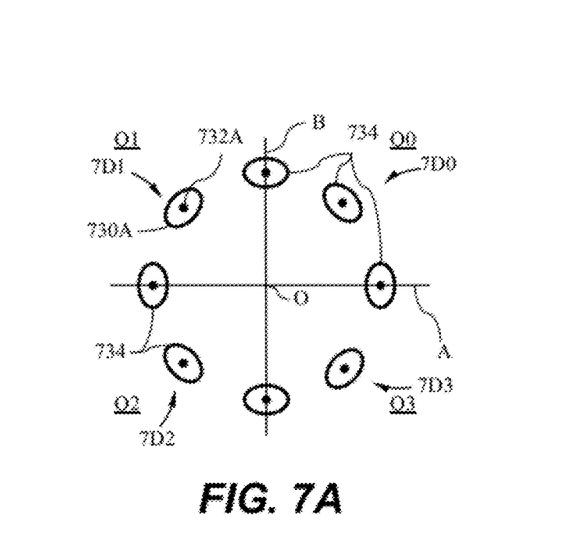
Figure 7B:
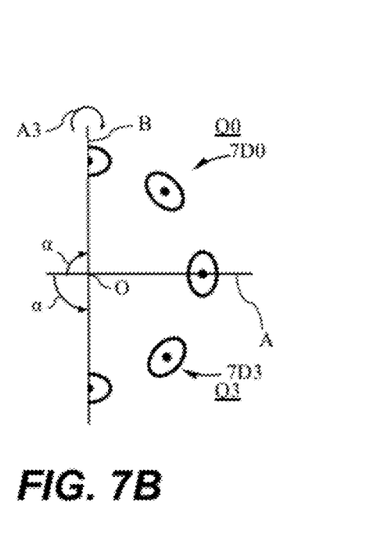
Figure 7C:
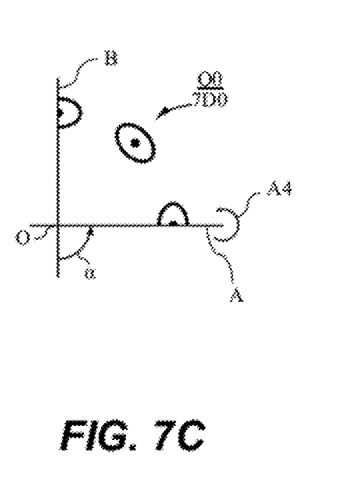
Figure 7D:
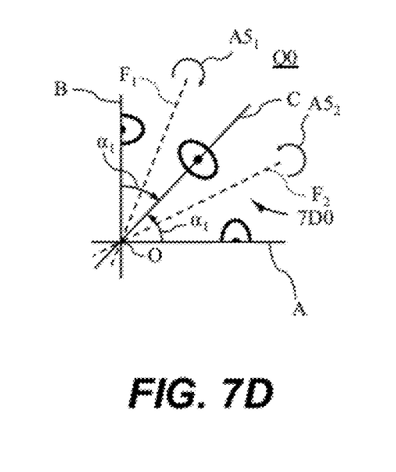
Figure 7E:
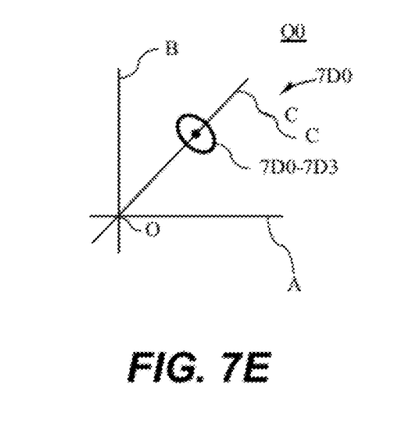

The various algorithms described herein may apply to any data signal having a M-PSK modulation format, where $M=2^N$, for N being an integer greater than 0. Turning to FIGS. 7A-7E, another exemplary algorithm will be described in greater detail. FIG. 7A depicts a data constellation corresponding to data 7D of a data signal 712 in a modulation format 8-PSK. The processing of such data 7D will result in a compensated data signal 722 having eight constellation points 740. As shown and for illustration purposes only, each of the constellation points 740 may have an elliptical shape 744 surrounding a centroid 742. The compensated data signal is distributed as data 7D0-7D3 across quadrants Q0-Q3, respectively. As discussed with respect to Data 6D of FIGS. 6A-6C, the data 7D1 of quadrant Q1 may be folded about the B axis as indicated by arrow A3 or rotated an angle α into quadrant Q0, a being 90 degrees for example, as shown in FIG. 7B. Similarly, the data 7D0 of quadrant Q2 may be folded about the B axis as indicated by arrow A3 or rotated an angle α of −90 degrees (counter-clockwise) into quadrant Q3. As depicted in FIG. 7C, the combined data D3, D4 of quadrant Q3 may then be folded into quadrant Q0 as indicted by arrow A4, or rotated and angle α of 90 degrees (clockwise) about the origin O. Once the data 7D is positioned within the quadrant Q0, the centroids 742 of each constellation point 740 is then aligned. As shown in FIG. 7D, for example, constellation data 7D0-1 may be folded about a dashed line F1 as indicated by arrow $A5_1$. Alternatively, the constellation data 7D0-1 may be rotated an angle $\alpha_1$ with respect to the B axis, the angle $\alpha_1$ being approximately 45 degrees (clockwise) for example. Similarly, the constellation data 7D0-2 may be folded about a dashed line F2 as indicated by arrow $A5_2$. Alternatively, the constellation data 7D0-2 may be rotated an angle $\alpha_1$ with respect to the A axis, the angle $\alpha_1$ being −45 degrees (counter-clockwise) for example. The resultant data 7D0-7D3 is merged together within the quadrant Q0, the data 7D0-7D3 collectively having a centroid 742C which is positioned along a line C which also passes through the origin O, as shown in FIG. 7E.

The variances or lengths R1 and R2 associated with the data 7D0-7D3 can then be calculated to define a feedback or correction signal, as described in more detail above. For example, the processing circuit 130 of FIG. 1A then provides the feedback or correction signal 132 to the phase recovery circuit 120. The length of the filter 124, as part of the phase recovery circuit 120, may then be adjusted to an optimum value to improve the performance of the receiver.

Figure 8:
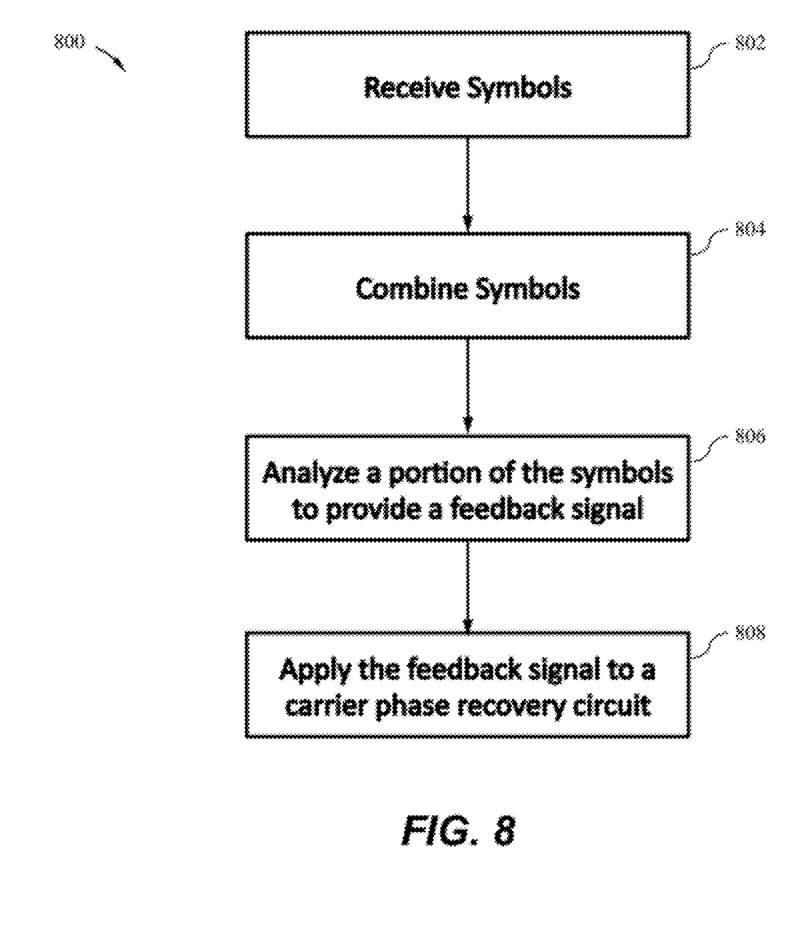
FIG. 8 illustrates a method, according to certain aspects of the embodiments of this disclosure.

Turning to FIG. 8, a method 800 in accordance with certain aspects of the embodiments of the disclosure is shown. In a step 802, a plurality of symbols are received, the plurality of symbols part of a compensated data signal similar to compensated data signal 122 of FIG. 1A. The symbols of a first quadrant of a data constellation may then be combined with symbols from one or more of the three remaining quadrants in an optional step 804 to provide additional data symbols for analysis in the determination of an optimum length of the filter 124. If applicable, the combined symbols may be from any of the four quadrants. A portion of the symbols are then analyzed, in a processing circuit similar to circuit 120 for example, to provide a feedback or correction signal similar to the correction signal 132 in a step 806. For example, a first variance and a second variance may be determined with respect to the portion of the symbols, and based upon the difference of these variances the feedback or correction signal is provided, as described in greater detail above. The portion of the symbols may include symbols from any combination of symbols of the individual quadrants, such as quadrants Q0-Q3 of FIG. 3A, depending on whether the optional step 802 is performed. In certain cases, all the symbols may be combined in a signal quadrant for processing. The feedback or correction signal is then provided to the phase recovery circuit in a step 808, the length of a filter, such as filter 124 as part of the phase recovery circuit 120 of FIG. 1A, being adjusted according to the feedback or correction signal as described in greater detail above, optimizing the filter, and ultimately the optical receiver, performance.

While the various embodiments of the disclosure have been described in conjunction with several specific embodiments, it is evident to those skilled in the art that many further alternatives, modifications and variations will be apparent in light of the foregoing description. Thus, the embodiments described herein are intended to embrace all such alternatives, modifications, applications and variations as may fall within the spirit and scope of the appended claims.

What is claimed is:

1. A method, comprising:
   receiving a data signal including a plurality of symbols;
   filtering the plurality of symbols with a digital filter, the digital filter having a filter length;
   processing a portion of the plurality of symbols to define a geometric shape on a complex plane, the geometric shape including a centroid and a circumference;
   generating a correction signal from a difference between a first value and a second value, the first value being a first variance value associated with the portion of the plurality of symbols extending from the centroid of the geometric shape to the circumference of the geometric shape along a first axis, and the second value being a second variance value extending from the centroid of the geometric shape to the circumference of the geometric shape along a second axis, the first axis being orthogonal to the second axis, the first variance value corresponding to a square of a first standard deviation with respect to a first distribution of data along the first axis and the second variance value corresponding to a square of a second standard deviation with respect to a second data distribution along the second axis, the first and second distributions of data corresponding to the portion of the plurality of symbols; and adjusting the filter length of the digital filter based upon the correction signal.

2. The method of claim 1, wherein the distributions of data being provided on the complex plane including first, second, third and fourth quadrants, the portion of the plurality of symbols being located in at least one of the first, second, third and fourth quadrants.

3. The method of claim 2, wherein the first and second distributions of data define the geometric shape.

4. The method of claim 3, wherein the geometric shape is an elliptical shape.

5. The method of claim 3, wherein the geometric shape is a tear-drop shape.

6. The method of claim 3, wherein the geometric shape is a circular shape.

7. The method of claim 1, wherein a portion of the method is performed in an application specific integrated circuit.

8. The method of claim 1, wherein a portion of the method is performed in a programmable gate array.

9. The method of claim 1, wherein each of the plurality of symbols includes a real portion and an imaginary portion.

10. The method of claim 1, wherein the filter is configured to accept a number of successive signals on a plurality of taps and sum the number of contiguous symbols into a filtered data signal provided as an output of the filter, the number of the plurality of taps being the length of the filter.

11. The method of claim 1, wherein the portion of the plurality of symbols is located in one or more of first, second, third and fourth quadrants of the complex plane.

12. A method, comprising:
receiving a data signal, the data signal including a plurality of symbols;
filtering the data signal with a filter to provide a filtered data signal, the filter having a length;
generating a compensated data signal, in part, from the filtered data signal;
processing the plurality of symbols of the compensated data signal into a data group associated with a corresponding one of four quadrants of a complex plane, the data group including a plurality of complex numbers, each having a real portion and an imaginary portion;
processing a subset of the data group to define a geometric shape on the complex plane, the geometric shape having a first dimension of a first length and a second dimension of a second length, the first dimension being orthogonal to the second dimension; and
determining a difference between the first and second lengths and adjusting the filter length of the filter based upon the difference, the first length being a first variance value corresponding to a square of a first standard deviation with respect to a first distribution of a first part of the data group along the first dimension and the second length being a second variance value corresponding to a square of a second standard deviation with respect to a second distribution of a second part of the data group along the second dimension.

13. The method of claim 12, wherein the real and imaginary portions of each complex number in the subset of the data group is a positive value.

14. The method of claim 12, wherein the real and imaginary portions of each complex number in the subset of the data group is a negative value.

15. The method of claim 12, wherein each of the plurality of symbols represents multiple bits.

16. The method of claim 12, wherein the geometric shape includes a centroid and a circumference, the first length extending from the centroid to the circumference along a first axis, the second length extending from the centroid to the circumference along a second axis.

17. The method of claim 12, wherein the geometric shape includes a major axis and a minor axis, the first dimension being along the major axis of the geometric shape and the second dimension being along the minor axis of the geometric shape.

18. The method of claim 12, wherein at least one of the first and second dimensions is along a major axis of the geometric shape.

19. The method of claim 12, wherein the first length is greater than the second length.

20. The method of claim 12, wherein adjusting the filter length of the filter results in a decrease in the filter length.

21. The method of claim 12, wherein adjusting the filter length of the filter results in an increase in the filter length.

22. A method, comprising:
receiving a data signal including a plurality of symbols;
filtering the plurality of symbols with a digital filter, the digital filter having a filter length;
processing the plurality of symbols into one of four data groups, each of the four data groups being associated with a corresponding one of four quadrants of a complex plane;
processing a first of the four data groups in a first of the four quadrants of the complex plane to define a geometric shape having a first dimension of a first length and a second dimension of a second length, the first dimension being orthogonal to the second dimension; and
determining a difference between the first and second lengths and adjusting the filter length of the filter based upon the difference, the first length being a first variance value corresponding to a square of a first standard deviation with respect to a first distribution of a first part of the first data group along the first dimension and the second length being a second variance value corresponding to a square of a second standard deviation with respect to a second distribution of a second part of the first data group along the second dimension.

23. The method of claim 22, further comprising combining the plurality of symbols associated with a second of the four data groups with the plurality of symbols associated with the first of the four data groups prior to processing the first of the four data groups.

24. The method of claim 23, further comprising combining the plurality of symbols associated with a third of the four data groups with the plurality of symbols associated with the first of the four data groups prior to processing the first of the four data groups.

25. The method of claim 24, further comprising combining the plurality of symbols associated with a fourth of the four data groups with the plurality of symbols associated with the first of the four data groups prior to processing the first of the four data groups.

26. The method of claim 25, wherein the complex plane includes an origin and the geometric shape of the first data group is a first geometric shape, the second of the four data groups defining a second geometric shape, the third of the four data groups defining a third geometric shape, the fourth of the four data groups defining a fourth geometric shape, each of the first, second, third, and fourth geometric shapes having a centroid, the method including rotating the plurality of symbols associated with each of the second, third, and fourth of the four data groups about the origin of the complex plane such that the centroid of each of the four geometric shapes are aligned.

* * * * *